(12) United States Patent
Calaway et al.

(10) Patent No.: US 7,800,857 B1
(45) Date of Patent: Sep. 21, 2010

(54) DISK DRIVE CALIBRATING VOICE COIL RESISTANCE FOR VELOCITY CONTROL OF VOICE COIL MOTOR

(75) Inventors: Charles J. Calaway, Santa Ana, CA (US); Ashok K. Desai, Westlake Village, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/433,572

(22) Filed: Apr. 30, 2009

(51) Int. Cl.
*G11B 21/02* (2006.01)
*G11B 5/596* (2006.01)
(52) U.S. Cl. .................... 360/75; 360/78.04
(58) Field of Classification Search ................ None
See application file for complete search history.

(56) References Cited

U.S. PATENT DOCUMENTS

| | | |
|---|---|---|
| 4,914,644 A | 4/1990 | Chen et al. |
| 5,844,743 A | 12/1998 | Funches |
| 5,982,130 A | 11/1999 | Male |
| 6,097,564 A | 8/2000 | Hunter |
| 6,690,536 B1 | 2/2004 | Ryan |
| 6,717,765 B2 | 4/2004 | Harmer |
| 6,731,450 B1 | 5/2004 | Codilian et al. |
| 6,795,268 B1 | 9/2004 | Ryan |
| 6,826,007 B1 | 11/2004 | Patton, III |
| 6,867,944 B1 | 3/2005 | Ryan |
| 6,900,959 B1 | 5/2005 | Gardner et al. |
| 6,917,486 B2 | 7/2005 | Tanner |
| 7,009,806 B2 | 3/2006 | Zayas et al. |
| 7,042,673 B2 | 5/2006 | Jeong |
| 7,068,463 B1 | 6/2006 | Ji et al. |
| 7,082,009 B2 | 7/2006 | Zayas et al. |
| 7,193,804 B1 * | 3/2007 | Kheymehdooz ....... 318/400.34 |
| 7,421,359 B2 | 9/2008 | Harmer et al. |
| 2005/0168862 A1 * | 8/2005 | Jeong .................... 360/75 |
| 2008/0030891 A1 | 2/2008 | Kim et al. |
| 2008/0123216 A1 * | 5/2008 | Kuramoto et al. ........ 360/75 |
| 2008/0198499 A1 | 8/2008 | Linggajaya et al. |

* cited by examiner

*Primary Examiner*—Andrew L Sniezek

(57) ABSTRACT

A disk drive is disclosed comprising an IR voltage detector operable to detect a resistive voltage due to a resistance of a voice coil in a voice coil motor, and a BEMF detector operable to subtract the resistive voltage from the voice coil voltage to generate a BEMF voltage. A gain Gr of the IR voltage detector is calibrated by:

(a) adjusting a control current applied to the voice coil;
(b) adjusting the gain Gr;
(c) detecting and saving the BEMF voltage corresponding to the adjusted gain Gr;
(d) repeating steps (b) and (c) at least once;
(e) repeating steps (a) through (d) at least once; and
(f) selecting an operating gain Gr of the IR voltage detector in response to the adjusted control currents, the adjusted gains Gr, and the saved BEMF voltages.

12 Claims, 5 Drawing Sheets

$$\text{BEMF} = (\text{Im} \cdot \text{Rm} - \text{Gr} \cdot \text{Im} \cdot \text{Rs}) \cdot \text{Gemf} \implies \frac{\text{BEMF}}{\text{Im} \cdot \text{Gemf}} = \text{Rm} - \text{Gr} \cdot \text{Rs} \implies \text{Gr} = \frac{\text{Rm}}{\text{Rs}}$$

FIG. 4A $$Sx = \sum_{s=1}^{n} Gr[s] \qquad Sx^2 = \sum_{s=1}^{n} Gr[s]^2$$

$$Sy = \sum_{s=1}^{n} \frac{BEMF[s]}{Im[s] \cdot Gemf} \qquad Sxy = \sum_{s=1}^{n} \frac{Gr[s] \cdot BEMF[s]}{Im[s] \cdot Gemf}$$

FIG. 4B $$Gr = \frac{Rm}{Rs} = \frac{Sx^2 Sy - Sx \cdot Sxy}{n \cdot Sxy - Sx \cdot Sy}$$

FIG. 4C $$
\text{Im}
\begin{bmatrix}
-35 \\
-25 \\
-15 \\
-5 \\
+5 \\
+15 \\
+25 \\
+35 \\
+45 \\
+55
\end{bmatrix}
\quad
\text{Gr}
\begin{bmatrix}
20 & 25 & 30 & 35 & 40 \\
20 & 25 & 30 & 35 & 40 \\
20 & 25 & 30 & 35 & 40 \\
20 & 25 & 30 & 35 & 40 \\
20 & 25 & 30 & 35 & 40 \\
20 & 25 & 30 & 35 & 40 \\
20 & 25 & 30 & 35 & 40 \\
20 & 25 & 30 & 35 & 40 \\
20 & 25 & 30 & 35 & 40 \\
20 & 25 & 30 & 35 & 40
\end{bmatrix}
\quad
\frac{\text{BEMF}}{\text{Im} \cdot \text{Gemf}}
\begin{bmatrix}
365 & 7 & -343 & -698 & -1053 \\
343 & 0 & -343 & -701 & -1054 \\
341 & -8 & -341 & -708 & -1058 \\
332 & -25 & -358 & -691 & -1049 \\
384 & 0 & -358 & -742 & -1075 \\
349 & -8 & -366 & -733 & -1092 \\
343 & -5 & -353 & -721 & -1075 \\
351 & -3 & -358 & -716 & -1067 \\
344 & -5 & -358 & -711 & -1066 \\
346 & -4 & -358 & -714 & -1065
\end{bmatrix}
$$

FIG. 4D

DISK DRIVE CALIBRATING VOICE COIL RESISTANCE FOR VELOCITY CONTROL OF VOICE COIL MOTOR

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

There are times when the servo control system does not have access to the embedded servo sectors yet it is still desirable to control the velocity of the actuator arm. For example, in disk drives employing ramp loading/unloading, it is desirable to control the velocity of the actuator arm so that the head is not damaged as it travels off the ramp onto the disk as well as off the disk onto the ramp. Another example is if the servo control system loses servo sector synchronization it is desirable to control the velocity of the actuator arm to facilitate re-synchronizing to the servo sectors.

Prior art techniques for controlling the velocity of the actuator arm when servo sector information is unavailable include using a velocity control loop with the detected back electromotive force (BEMF) voltage generated by the VCM as the feedback. The voltage across the voice coil (the voice coil voltage) comprises a component due to the inductance L of the VCM, a component due to the resistance R of the VCM, and a component due to the velocity of the VCM referred to as the BEMF voltage. If the component due to the resistance R is canceled from the voice coil voltage, at low frequencies Ldi/dt is small leaving the BEMF voltage due to the velocity of the VCM as the dominant component.

BRIEF DESCRIPTION OF THE DRAWINGS

FIG. 4A-4D illustrate an embodiment of the present invention wherein the gain Gr of the IR voltage detector is computed by computing a least squares fit.

DETAILED DESCRIPTION OF EMBODIMENTS OF THE INVENTION

Figure 1A:
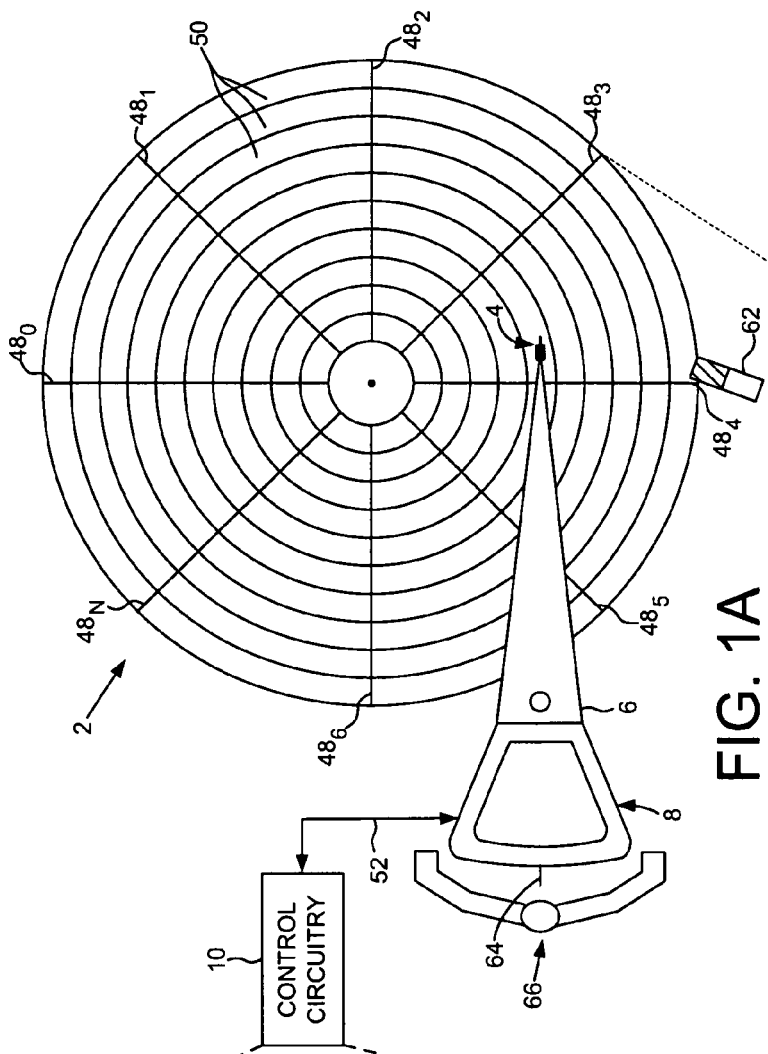
FIG. 1A shows a disk drive according to an embodiment of the present invention comprising a disk, a head actuated over the disk by a VCM, and control circuitry including an IR voltage detector for detecting a resistive voltage due to a resistance of the VCM.

FIG. 1A shows a disk drive according to an embodiment of the present invention comprising a disk 2, and a head 4 connected to a distal end of an actuator arm 6. A voice coil motor (VCM) comprising a voice coil 8 is operable to rotate the actuator arm 6 about a pivot to actuate the head 4 radially over the disk 2. The disk drive further comprises control circuitry 10 comprising a VCM control loop (FIG. 2) including a voltage detector 12 operable to detect a voice coil voltage 14 across the voice coil 8, and a current detector 16 operable to detect a current 18 flowing through the voice coil 8. An IR voltage detector 20, responsive to the detected current 18, is operable to detect a resistive voltage 22 due to a resistance of the voice coil 8. A BEMF detector 24 is operable to subtract the resistive voltage 22 from the voice coil voltage 14 to generate a BEMF voltage 26.

Figure 1C:
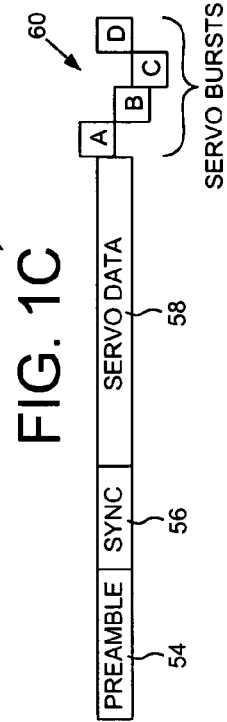
FIG. 1C shows a format of servo sectors that define data tracks on the disk according to an embodiment of the present invention.
Figure 1B:
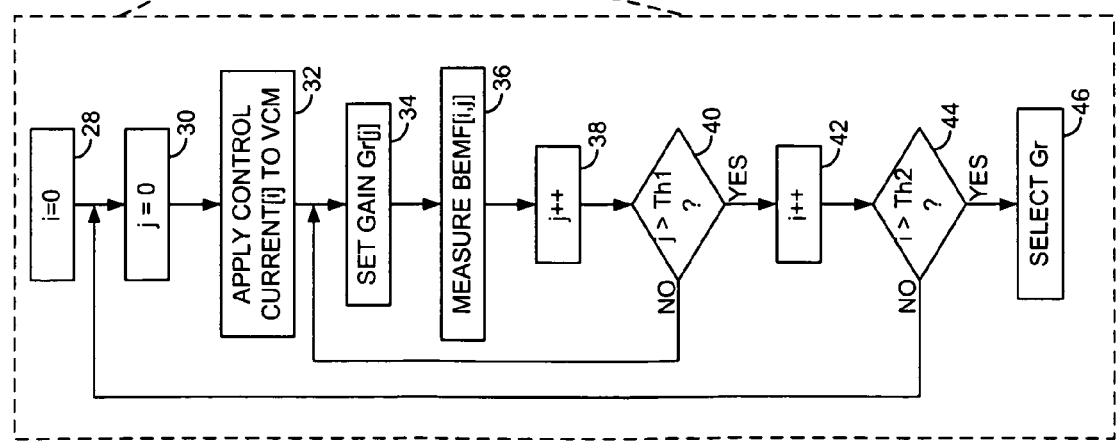
FIG. 1B is a flow diagram executed by the control circuitry according to an embodiment of the present invention for calibrating a gain Gr of the IR voltage detector.

The control circuitry 10 is further operable to calibrate a gain Gr of the IR voltage detector 20 by executing the flow diagram of FIG. 1B. After initializing a first index i (step 28) and a second index j (step 30), a control current applied to the voice coil is adjusted (step 32). The gain Gr is adjusted (step 34), and the BEMF voltage corresponding to the adjusted gain Gr is detected and saved (step 36). The index j is incremented (step 38) and the flow diagram repeated starting at step 34 until the index j exceeds a first threshold (step 40). The index i is then incremented (step 42) and the flow diagram repeated starting at step 30 until the index i exceeds a second threshold (step 44). An operating gain Gr of the IR voltage detector is then selected (step 46) in response to the adjusted control currents, the adjusted gains Gr, and the saved BEMF voltages.

In the embodiment of FIG. 1A, the disk 2 comprises a plurality of servo sectors $48_O$-$48_N$ that define a plurality of data tracks 50. The control circuitry 10 processes a read signal to demodulate the servo sectors $48_O$-$48_N$ into a position error signal (PES). The PES is filtered with a suitable compensation filter to generate a control signal 52 applied to the voice coil 8 of the VCM to pivot the actuator arm 6 and position the head 4 radially over the disk 2 in a direction that reduces the PES.

The servo sectors $48_O$-$48_N$ may comprise any suitable position information, and in an embodiment shown in FIG. 1C, each servo sector $48_i$ comprises a preamble 54 for storing a periodic pattern, which allows proper gain adjustment and timing synchronization of the read signal, and a sync mark 56 for storing a special pattern used to symbol synchronize to a servo data field 58. The servo data field 58 stores coarse head positioning information, such as a track address, used to position the head over a target data track during a seek operation. Each servo sector $48_i$ further comprises groups of servo bursts 60 (e.g., A, B, C and D bursts), which comprise a number of consecutive transitions recorded at precise intervals and offsets with respect to a data track centerline.

When the disk drive is powered down or otherwise idle, the control circuitry 10 may park the head 4 on a ramp 62 near an outer periphery of the disk 2 (or park the head on the disk in a landing zone near the inner diameter). A tang 64 coupled to the voice coil 8 interacts with a crash stop 66 in order to limit the stroke of the actuator arm 6. In addition, the actuator arm assembly typically comprises a latching mechanism, such as a magnet coupled to or embedded in the crash stop 66 for latching to the tang 64, or a slug embedded in the actuator arm for interacting with a magnet mounted to the base of the disk drive.

Figure 1D:
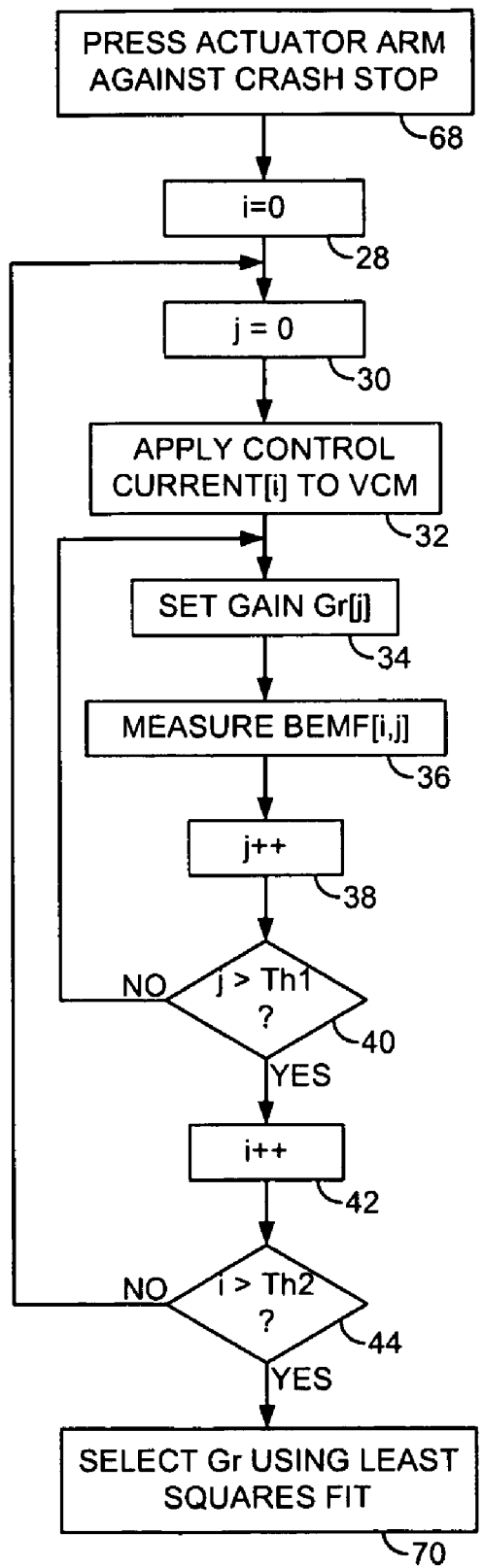
FIG. 1D is a flow diagram executed by the control circuitry according to an embodiment of the present invention wherein the gain Gr of IR voltage detector is calibrated by computing a least squares fit.

FIG. 1D is a flow diagram which extends on the flow diagram of FIG. 1B wherein prior to calibrating the gain Gr of the IR voltage detector 20, the actuator arm 6 is pressed against the crash stop (step 68). In this manner, the actuator arm 6 is substantially motionless so that the BEMF voltage is near zero when calibrating the gain Gr. In one embodiment, the techniques disclosed herein help compensate for noise caused by residual motion of the actuator arm 6 when calibrating the gain Gr. In the embodiment of FIG. 1D, after iteratively adjusting the control current and gain Gr and measuring the resulting BEMF voltages, the operating gain Gr of the IR voltage detector 20 is selected by computing a least squares fit (step 70).

Figure 2:
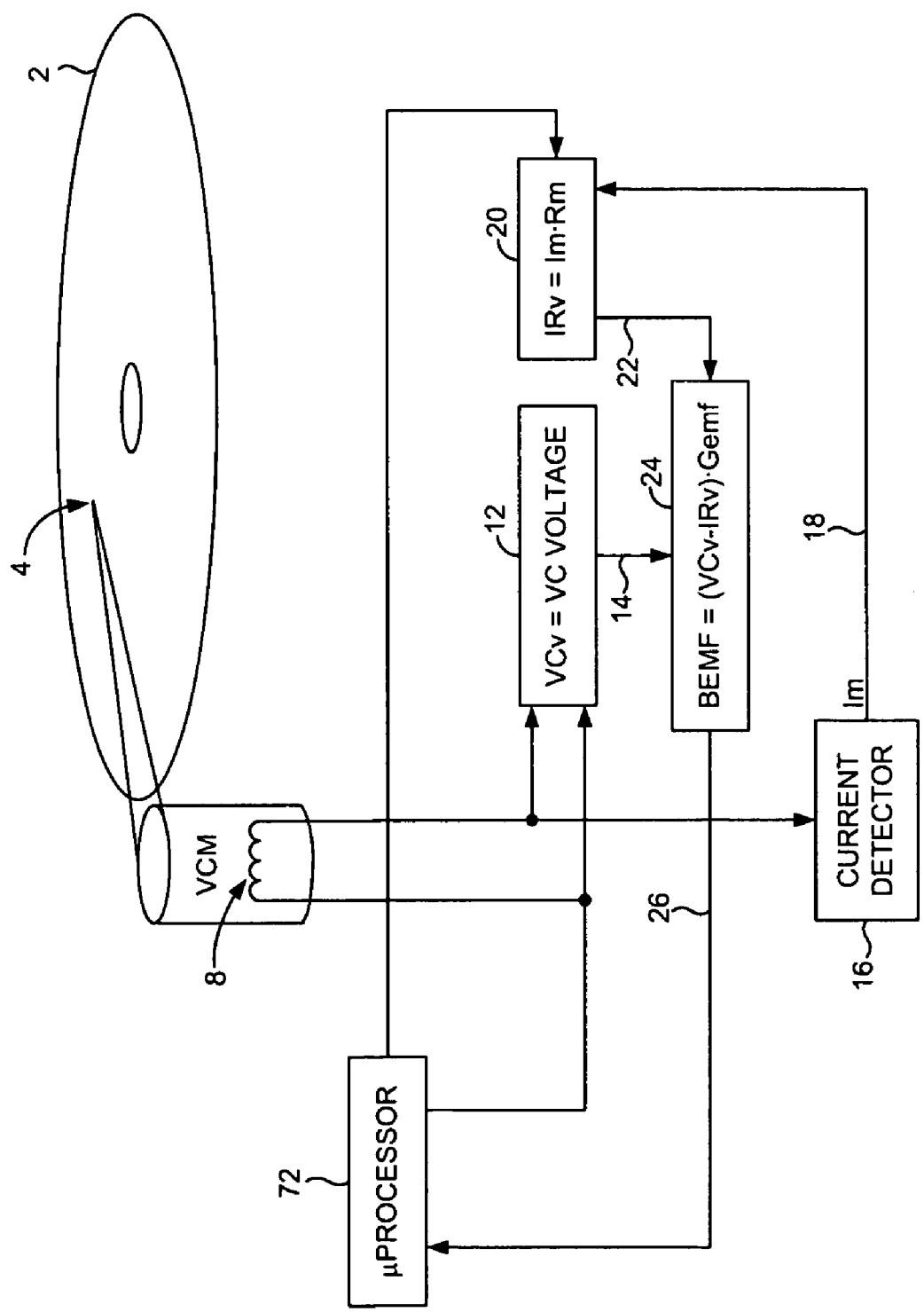
FIG. 2 shows control circuitry according to an embodiment of the present invention comprising a voice coil voltage detector, an IR voltage detector, and a BEMF voltage generator for generating a BEMF voltage by subtracting the IR voltage from the voice coil voltage.
Figure 3:
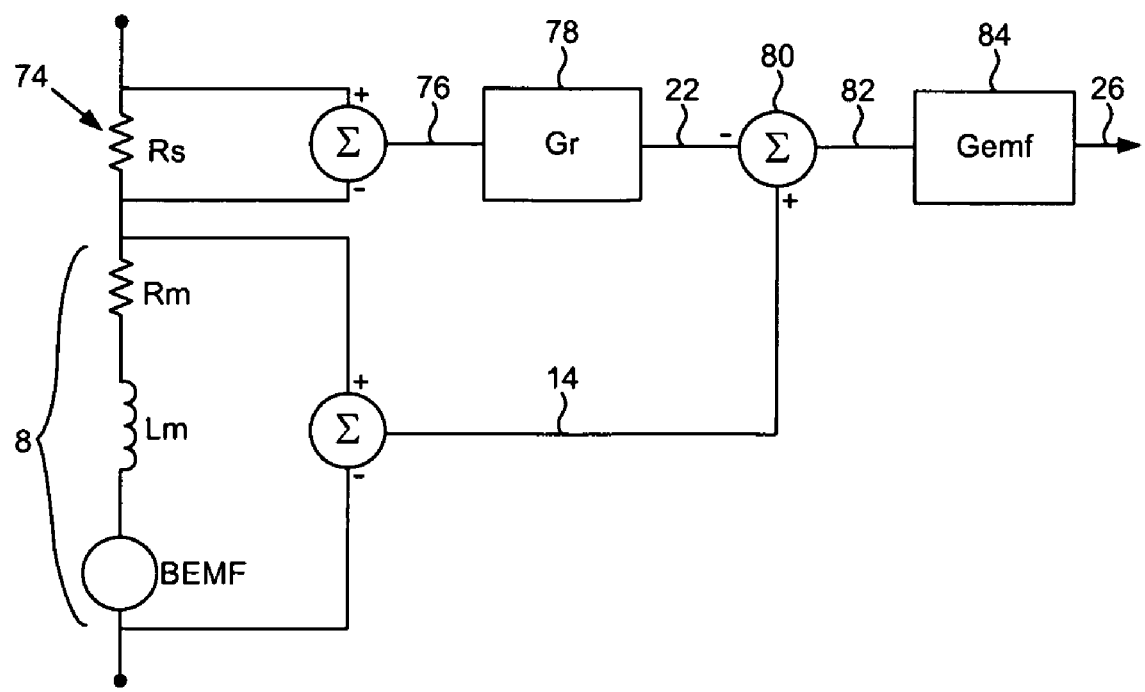
FIG. 3 shows control circuitry according to an embodiment of the present invention wherein the IR voltage detector comprises a sense resistor and a gain Gr for amplifying the voltage across the sense resistor.

FIG. 2 shows control circuitry according to an embodiment of the present invention including a microprocessor 72 for executing the steps of the flow diagrams, including to adjust the control current applied to the voice coil 8 and the gain Gr of the IR voltage detector 20, and measure the resulting BEMF voltage 26. The IR voltage detector 20 may be implemented using any suitable analog and/or digital circuitry, and in an embodiment shown in FIG. 3, the IR voltage detector 20 comprises a sense resistor 74 in series with the voice coil 8 of the VCM. The voltage 76 across the sense resistor 74 is amplified by the gain Gr 78 to generate the IR voltage 22. The IR voltage 22 is subtracted 80 from the voice coil voltage 14 to extract an un-scaled BEMF voltage 82 which is amplified by a gain Gemf 84 to generate a scaled BEMF voltage 26. In one embodiment, the scaled BEMF voltage 26 is a feedback signal processed in continuous time using analog circuitry, and in an alternative embodiment, the BEMF voltage 26 is sampled using an A/D converter and then processed in discrete-time as a feedback signal using digital circuitry (e.g., by the microprocessor 72).

FIG. 4A shows an equation according to an embodiment of the present invention for representing the measured BEMF voltage when the VCM is motionless. The gain Gr should be set to Rm/Rs so that the measured BEMF voltage is zero. Any suitable algorithm may be employed to determine the unknown value Rm/Rs, wherein in one embodiment, the unknown value Rm/Rs is determined by computing a least squares fit for a line defined by y=mx+b that best fits the measured data over the iterations shown in the flow diagrams. FIG. 4B shows equations for computing the least squares fit according to an embodiment of the present invention, wherein n represents the total number of samples taken (total number of BEMF voltages measured for the various control currents and gain Gr settings). FIG. 4C shows an equation according to an embodiment of the present invention for computing the unknown Rm/Rs which represents the operating gain Gr for the IR voltage detector 20.

FIG. 4D shows example values of the calibration procedure, including the control current Im applied to the voice coil, the adjusted gains Gr, and the resulting measured BEMF voltage divided by Im·Gemf. In this example, the gain Gr is adjusted 5 times for each of 10 control current settings for a total of 50 measurements (n=50). Any suitable control current values and gain Gr values may be selected to perform the calibration; however, the control current should not be set to zero to avoid an undefined value for the measured BEMF voltage divided by Im·Gemf.

The calibration procedure for selecting the operating gain Gr for the IR voltage detector 20 may be executed at any suitable time. In one embodiment, the calibration procedure may be executed during a manufacturing procedure for each disk drive, and in an alternative embodiment, the calibration procedure may be executed while the disk drive is in the field. In one embodiment, the calibration procedure may be executed periodically (e.g., each time the disk drive is powered on or after a predetermined interval), and in yet another embodiment, the calibration procedure may be executed relative to an environmental condition of the disk drive (e.g., a change in ambient temperature which may affect the voice coil resistance).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head connected to a distal end of an actuator arm;
   a voice coil motor (VCM) comprising a voice coil operable to rotate the actuator arm about a pivot to actuate the head radially over the disk;
   a VCM control loop comprising:
      a voltage detector operable to detect a voice coil voltage across the voice coil;
      a current detector operable to detect a current flowing through the voice coil;
      an IR voltage detector, responsive to the detected current, operable to detect a resistive voltage due to a resistance of the voice coil; and
      a BEMF detector operable to subtract the resistive voltage from the voice coil voltage to generate a BEMF voltage; and
   control circuitry operable to calibrate a gain Gr of the IR voltage detector by:
      (a) adjusting a control current Im applied to the voice coil;
      (b) adjusting the gain Gr;
      (c) detecting and saving the BEMF voltage corresponding to the adjusted gain Gr;
      (d) repeating steps (b) and (c) at least once;
      (e) repeating steps (a) through (d) at least once; and
      (f) selecting an operating gain Gr of the IR voltage detector in response to the adjusted control currents, the adjusted gains Gr, and the saved BEMF voltages.

2. The disk drive as recited in claim 1, wherein the control circuitry is further operable to calibrate the gain Gr of the IR voltage detector by pressing the actuator arm against a crash stop.

3. The disk drive as recited in claim 1, wherein the control circuitry is further operable to select the operating gain Gr of the IR voltage detector by computing a least squares fit in response to the adjusted control currents, the adjusted gains Gr, and the saved BEMF voltages.

4. The disk drive as recited in claim 3, wherein the BEMF detector is further operable to generate the BEMF voltage in response to a gain Gemf.

5. The disk drive as recited in claim 4, wherein the control circuitry is further operable to compute the least squares fit by computing:

$$Sx^2 = \sum_{s=1}^{n} Gr[s]$$

$$Sx^2 = \sum_{s=1}^{n} Gr[s]^2$$

$$Sy = \sum_{s=1}^{n} \frac{BEMF[s]}{Im[s] \cdot Gemf}$$

$$Sxy = \sum_{s=1}^{n} \frac{Gr[s] \cdot BEMF[s]}{Im[s] \cdot Gemf}.$$

6. The disk drive as recited in claim 5, wherein the control circuitry is further operable to select the operating gain Gr according to:

$$\frac{Sx^2 \cdot Sy - Sx \cdot Sxy}{n \cdot Sxy - Sx \cdot Sy}.$$

7. A method of operating a disk drive, the disk drive comprising a disk, a head connected to a distal end of an actuator arm, a voice coil motor (VCM) comprising a voice coil operable to rotate the actuator arm about a pivot to actuate the head radially over the disk, and a VCM control loop comprising:
   a voltage detector operable to detect a voice coil voltage across the voice coil;
   a current detector operable to detect a current flowing through the voice coil;
   an IR voltage detector, responsive to the detected current, operable to detect a resistive voltage due to a resistance of the voice coil; and
   a BEMF detector operable to subtract the resistive voltage from the voice coil voltage to generate a BEMF voltage; and the method comprising:
   (a) adjusting a control current Im applied to the voice coil;
   (b) adjusting the gain Gr;
   (c) detecting and saving the BEMF voltage corresponding to the adjusted gain Gr;
   (d) repeating steps (b) and (c) at least once;
   (e) repeating steps (a) through (d) at least once; and
   (f) selecting an operating gain Gr of the IR voltage detector in response to the adjusted control currents, the adjusted gains Gr, and the saved BEMF voltages.

8. The method as recited in claim 7, further comprising pressing the actuator arm against a crash stop.

9. The method as recited in claim 7, wherein selecting the operating gain Gr of the IR voltage detector comprises computing a least squares fit in response to the adjusted control currents, the adjusted gains Gr, and the saved BEMF voltages.

10. The method as recited in claim 9, wherein the BEMF detector is further operable to generate the BEMF voltage in response to a gain Gemf.

11. The method as recited in claim 10, wherein the least squares fit is computed according to:

$$Sx^2 = \sum_{s=1}^{n} Gr[s]$$

$$Sx^2 = \sum_{s=1}^{n} Gr[s]^2$$

$$Sy = \sum_{s=1}^{n} \frac{BEMF[s]}{Im[s] \cdot Gemf}$$

$$Sxy = \sum_{s=1}^{n} \frac{Gr[s] \cdot BEMF[s]}{Im[s] \cdot Gemf}.$$

12. The method as recited in claim 11, wherein selecting the operating gain Gr comprises computing:

$$\frac{Sx^2 \cdot Sy - Sx \cdot Sxy}{n \cdot Sxy - Sx \cdot Sy}.$$

* * * * *